United States Patent Office 2,873,191
Patented Feb. 10, 1959

2,873,191
PREPARATION OF COTTONSEED MEAL SUITABLE FOR UNRESTRICTED USE IN LAYING HEN DIETS

William H. King, Metairie, and Aaron M. Altschul and Joseph M. Dechary, New Orleans, and Vernon L. Frampton, Metairie, La., assignors to the United States of America as represented by the Secretary of Agriculture No Drawing. Application March 18, 1957
Serial No. 646,939

3 Claims. (Cl. 99—4)

(Granted under Title 35, U. S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to treating cottonseed meats, prior to removal of oil, to improve the character of meals which can be obtained and to provide a method by which gossypol contained in the meats is chemically modified without causing detrimental changes in the cottonseed protein. More particularly the invention relates to treatment of cottonseed meats to provide meals suitable for feeding in unrestricted amount to laying hens without causing eggs produced by the hens to become discolored upon storage.

Heretofore a number of procedures for preparing cottonseed meal by extraction of the oil from cottonseed meats have been in use. All of these procedures involve heating of the cottonseed meats prior to extraction of the oil by pressing and/or solvent extraction. All of these procedures cause some denaturation of the protein, as shown by the solubility of the meal nitrogen in aqueous solutions, such as 0.02 N NaOH, with consequent reduction of its nutritive value. Some of them, such as the hydraulic pressing procedure, may result in meals containing amounts of "free gossypol" as defined by the A. O. C. S. Tentative Method Ba7-55 which are toxic to nonruminant animals, such as swine and poultry. Others, such as the screw-press and prepress-solvent extraction procedures, may leave amounts of "free gossypol" in the meal (above 0.01%) which are nontoxic to these animals but which are still sufficient to cause discoloration of the yolks of eggs laid by hens fed unrestricted amounts of the meals in their rations.

King et al. (U. S. 2,726,155) have described a process for mildly cooking cottonseed meats of a high added moisture content (20 to 50%), with vigorous stirring, in the presence of basic or acidic substances, which produces cottonseed meals, after oil extraction, which are nontoxic and of unusually high nutritive value. All of these meals, however, still contain "free gossypol" in amounts (above 0.01%) which, although nontoxic to poultry, are sufficient to cause discoloration of the yolks of eggs when fed in unrestricted amount to laying hens.

We have now discovered, upon further experimentation, that when cottonseed meats are treated under the above conditions with a fatty amine, such as octadecyl amine (stearyl amine), with or without addition of other basic or acidic substances, the resulting meal, after removal of oil by conventional means (such as extraction with a liquid hydrocarbon) contains a surprisingly low amount of residual "free gossypol" (below 0.01%). Feeding experiments with laying hens show that this meal may be used in unrestricted amount for supplying supplemental protein in laying-hen diets without causing discoloration of eggs from the hens.

While the particular fatty amine used in the experiments leading to the above discovery was stearyl amine (octadecyl amine) the principle established would apply equally to all primary aliphatic amines of the general formula:

$$R\text{---}NH_2$$

where "R" is an alkyl or alkylene group, either saturated with respect to linkage of the carbon bonds with hydrogen, such as pentyl-, hexyl-, octyl-, decyl-, dodecyl-, tetradecyl-, hexadecyl-, octadecyl-, etc., or unsaturated alkylene groups such as oleyl-, linoleyl-, octadecenyl-, octadecadienyl-, etc., or any mixture of any two or more of the above class of aliphatic primary amines, either straight-chained or branched-chained.

The following examples are illustrative of details of the invention. The term "parts" refers to parts by weight.

Example 1

*Cottonseed meats with alkali and fatty amine.*—A sample of 300 parts of cottonseed flakes having a moisture content of 7.0% is prepared by conventional decorticating and flaking procedures. The flakes are mixed with 200 parts of water containing 2.4 parts of sodium hydroxide and 6.3 parts of stearyl amine. The mixture is heated to 125° F. while stirring in a model C-10 Hobart food mixer, modified as described in U. S. 2,726,155, and a current of warm air is applied to facilitate evaporative dehydration. After a prestirring period of sufficient time to rupture substantially all of the gossypol-containing glands (20 to 60 minutes) at the low temperature (125° F.) the rate of heating is increased, causing the temperature of the material to rise to a final temperature of 212° F. in approximately 30 minutes. After cooling to ambient temperature the oil is extracted from the treated meats with a liquid hydrocarbon such as commercial hexane mixture or benzene. The resulting meal was found by chemical analysis to contain less than 0.010% of gossypol.

Example 2

*Cottonseed meats with acid and fatty amine.*—A sample of 300 parts of cottonseed flakes having a moisture content of 7.0% is prepared by conventional decorticating and flaking procedures. The flakes are mixed with 200 parts of water containing 6.0 parts of orthophosphoric acid and 6.3 parts of stearyl amine. The mixture is heated to 125° F. while stirring in a model C-10 Hobart food mixer, modified as described in U. S. 2,726,155, and a current of warm air is applied to facilitate evaporative dehydration. After a prestirring period of sufficient time to rupture substantially all of the gossypol-containing glands (20 to 60 minutes) at the low temperature (125° F.) the rate of heating is increased, causing the temperature of the material to rise to a final temperature of 212° F. in approximately 30 minutes. After cooling to ambient temperature the oil is extracted from the treated meats with a liquid hydrocarbon such as commercial hexane mixture or benzene. The resulting meal was found by chemical analysis to contain less than 0.010% of gossypol.

Example 3

*Cottonseed meats with fatty amines.*—A sample of 300 parts of cottonseed flakes having a moisture content of 7.0% is prepared by conventional decorticating and flaking procedures. The flakes are mixed with 200 parts of water containing 6.3 parts of stearyl amine. The mixture is heated to 125° F. while stirring in a model C-10 Hobart food mixer modified as described in U. S. 2,726,155 and a current of warm air is applied to facilitate evaporative dehydration. After prestirring for a sufficient period of time to rupture substantially all of the gossypol-containing glands (20 to 60 minutes) at the low temperature (125° F.) the rate of heating is increased, causing the temperature of the material to rise to a final temperature of 212° F. in approximately 30 minutes. After cooling to ambient temperature the oil is extracted from the treated meats with a liquid hydrocarbon such as commercial hexane mixture or benzene. The resulting meal was found by chemical analysis to contain less than 0.010% of gossypol. Biological testing of the meal by feeding to laying hens showed that it can be used in unlimited amount without causing egg discoloration.

We claim:

1. A process for treating raw decorticated flaked and unextracted cottonseed meats to produce a cottonseed meal, which meal following extraction of the oil will contain "free gossypol" in an amount less than 0.01% and which meal when fed in unrestricted amounts to laying hens will not produce egg yolk discoloration, comprising the following steps: (a) adjusting the moisture content of the cottonseed flakes to from about 20 to 50% with water containing at least enough stearyl amine to react with the "free gossypol" present in the flakes; (b) dehydratively heating the amine treated flakes at 125° F. with continued agitation for from about 20 to 60 minutes until the moisture content is reduced to not more than about 25%; (c) continuing the agitation and dehydrative heating until the moisture content of the heated flakes has been reduced to from about 7 to 13%; (d) cooling the treated flakes to ambient temperature and extracting the oil from the treated flakes.

2. The process of claim 1 in which the pH of the amine treated meal is adjusted by the incorporation of an alkali metal hydroxide.

3. The process of claim 1 in which the pH is adjusted by the incorporation of phosphoric acid.

References Cited in the file of this patent

UNITED STATES PATENTS

| | | |
|---|---|---|
| 2,607,687 | Rice | Aug. 19, 1952 |
| 2,641,542 | Ulrey | June 9, 1953 |
| 2,726,155 | King et al. | Dec. 6, 1955 |